(12) United States Patent
Ninbari et al.

(10) Patent No.: US 11,767,002 B2
(45) Date of Patent: Sep. 26, 2023

(54) BRAKE HYDRAULIC PRESSURE CONTROLLER

(71) Applicant: Robert Bosch GmbH, Stuttgart (DE)

(72) Inventors: Tsutomu Ninbari, Kanagawa (JP); Yoshio Tajika, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 16/959,031

(22) PCT Filed: Dec. 18, 2018

(86) PCT No.: PCT/IB2018/060233
§ 371 (c)(1),
(2) Date: Jun. 29, 2020

(87) PCT Pub. No.: WO2019/138281
PCT Pub. Date: Jul. 18, 2019

(65) Prior Publication Data
US 2020/0339088 A1   Oct. 29, 2020

(30) Foreign Application Priority Data
Dec. 27, 2017   (JP) .................... 2017-250627

(51) Int. Cl.
*B60T 13/16*    (2006.01)
*F04B 19/04*    (2006.01)

(52) U.S. Cl.
CPC .......... *B60T 13/168* (2013.01); *F04B 19/04* (2013.01)

(58) Field of Classification Search
CPC ...... B60T 8/4031; B60T 8/408; B60T 13/168; F04B 19/04
See application file for complete search history.

(56) References Cited

U.S. PATENT DOCUMENTS

| 5,094,599 A | 3/1992 | Budecker |
| 5,199,860 A | 4/1993 | Stegmaier |

(Continued)

FOREIGN PATENT DOCUMENTS

| DE | 19650272 A1 | 6/1998 |
| EP | 2060458 A2 | 5/2009 |

(Continued)

OTHER PUBLICATIONS

Machine translation of WO 2007/028687 (no date).*
International Search Report and Written Opinion for Application No. PCT/IB2018/060233 dated Mar. 15, 2019 (14 pages).

*Primary Examiner* — Nicholas J Lane
(74) *Attorney, Agent, or Firm* — Michael Best & Friedrich LLP (57) ABSTRACT

[Problem] A brake hydraulic pressure controller capable of being formed with a relatively large damper chamber while suppressing enlargement of a housing is provided.
[Means for Resolution] The brake hydraulic pressure controller includes: a motor having a motor shaft; a skew plate fixed to a tip of the motor shaft and arranged to be inclined with respect to an axial direction of the motor shaft; and a pump element driven by rotation of the motor shaft and the skew plate. The pump element has: a piston that reciprocates in parallel with the axial direction of the motor shaft in conjunction with the rotation of the skew plate; an accommodation chamber that accommodates a part of the piston and to which a brake fluid is introduced; a release valve that releases the brake fluid from the accommodation chamber; and a pressure damper chamber that is provided in a reciprocal direction of the piston and into which the brake fluid released from the release valve flows.

21 Claims, 6 Drawing Sheets

(56) References Cited

U.S. PATENT DOCUMENTS

| | | | | |
|---|---|---|---|---|
| 5,232,273 | A | * | 8/1993 | Eckstein ............... B60T 8/4068 |
| | | | | 303/116.4 |
| 5,882,089 | A | * | 3/1999 | Nakamura ............. B60T 8/344 |
| | | | | 303/10 |
| 6,302,663 | B1 | * | 10/2001 | Schuller ................ F04B 1/0408 |
| | | | | 417/470 |
| 6,896,338 | B2 | * | 5/2005 | Nakayasu ............. B60T 8/4872 |
| | | | | 303/113.1 |
| 2002/0195871 | A1 | * | 12/2002 | Mohr ...................... F04B 17/03 |
| | | | | 303/115.4 |
| 2003/0053920 | A1 | * | 3/2003 | Hinz ................... F04B 53/1002 |
| | | | | 417/470 |
| 2004/0166004 | A1 | * | 8/2004 | Schmitt ................. B60T 8/4031 |
| | | | | 417/470 |
| 2006/0099090 | A1 | * | 5/2006 | Kramp .................... B60T 8/368 |
| | | | | 417/415 |
| 2009/0127925 | A1 | * | 5/2009 | Borgemenke ......... B60T 8/4031 |
| | | | | 417/462 |
| 2009/0295220 | A1 | * | 12/2009 | Gegalski ............... F04B 1/0439 |
| | | | | 303/116.4 |
| 2017/0021814 | A1 | * | 1/2017 | Schumann ............ B60T 8/4031 |

FOREIGN PATENT DOCUMENTS

| | | | |
|---|---|---|---|
| EP | 3130803 | A1 | 2/2017 |
| GB | 1465022 | A | 2/1977 |
| JP | H1047256 | A | 2/1998 |
| JP | 2009234399 | A | 10/2009 |
| JP | 2016210326 | A | 12/2016 |
| WO | 2007028687 | A1 | 3/2007 |
| WO | 2010019661 | A1 | 2/2010 |
| WO | 2012079815 | A1 | 6/2012 |

* cited by examiner

BRAKE HYDRAULIC PRESSURE CONTROLLER

BACKGROUND OF THE INVENTION

The present invention relates to a brake hydraulic pressure controller.

Conventionally, a brake hydraulic pressure controller that executes brake control by controlling a hydraulic pressure of a brake fluid to be supplied to a braking section in a hydraulic circuit has been known.

The brake hydraulic pressure controller has: a regulation valve that is freely openable/closable; a pump element that is operated in cooperation with the regulation valve; and the like. The brake hydraulic pressure controller is automatically operated by electronic control, and controls a braking force that is generated on a wheel by increasing or reducing the hydraulic pressure in the brake hydraulic pressure circuit.

For example, the pump element has a piston that abuts an eccentric cam provided on a motor shaft and reciprocates by rotation of the eccentric cam. The brake fluid is suctioned via an intake valve in conjunction with this reciprocation of the piston, and the brake fluid is released via a release valve (for example, see JP-A-2016-210326).

SUMMARY OF THE INVENTION

Here, in the conventional brake hydraulic pressure controller, the pump element is provided along a perpendicular direction to an axial direction of the motor shaft. That is, the pump element is assembled such that a reciprocal direction of the piston in the pump element is set to the perpendicular direction to the axial direction of the motor shaft.

Accordingly, in the case where the plural pump elements are provided in the brake hydraulic pressure controller, the pump elements have to be arranged radially around the motor shaft, or the pump elements have to be aligned in the axial direction of the motor shaft.

Thus, when it is attempted to secure a space in which the plural pump elements are arranged with the regulation valve, an internal channel, and the like in a housing of a hydraulic unit, an outer shape of the housing tends to be enlarged. As a result, it is difficult to secure a large damper chamber that suppresses pressure pulsations of the brake fluid discharged from each of the pump elements.

The present invention has been made in view of the above problem and therefore provides a brake hydraulic pressure controller in which a relatively large damper chamber can be formed while enlargement of a housing is suppressed.

In an aspect of the present invention, a brake hydraulic pressure controller that controls a hydraulic pressure of a brake hydraulic pressure circuit is provided. The brake hydraulic pressure controller includes: a motor having a motor shaft; a skew plate fixed to a tip of the motor shaft and arranged to be inclined with respect to an axial direction of the motor shaft; and a pump element driven by rotation of the motor shaft and the skew plate. The pump element has: a piston that reciprocates in parallel with the axial direction of the motor shaft in conjunction with the rotation of the skew plate; an accommodation chamber that accommodates a part of the piston and to which a brake fluid is introduced; a release valve that releases the brake fluid from the accommodation chamber; and a pressure damper chamber that is provided in a reciprocal direction of the piston and into which the brake fluid released from the release valve flows.

Advantageous Effects of Invention

According to the present invention that has been described so far, the relatively large damper chamber can be formed while enlargement of a housing is suppressed.

DETAILED DESCRIPTION

A detailed description will hereinafter be made on a preferred embodiment of the present invention with reference to the accompanying drawings. In the specification and the drawings, components that have substantially the same functional configurations will be denoted by the same reference signs, and a description thereon will not be repeated.

1. Brake Hydraulic Circuit

A description will be made on a configuration example of a brake hydraulic circuit 1 to which a brake hydraulic pressure controller 20 according to this embodiment can be applied with reference to FIG. 1.

The brake hydraulic circuit 1 according to this embodiment is applied to a brake system that increases a depression force of a brake pedal 10 by a driver without using a booster and transmits the increased depression force to a wheel cylinder. The brake system depicted in FIG. 1 is a brake system for a four-wheel drive vehicle.

In the case where the vehicle is braked, the driver performs a depressing operation of the brake pedal 10. As long as an element can receive a braking request by the driver, the brake pedal 10 can be replaced with such an operation element.

The brake pedal 10 is connected to a piston rod 11. The piston rod 11 is provided with a stroke sensor 8 that detects a stroke amount as an axial displacement amount of the piston rod 11.

A reservoir tank 16 retains hydraulic oil as a fluid that generates a hydraulic pressure. The reservoir tank 16 is connected to a master cylinder 14 and supplies the hydraulic oil into the master cylinder 14.

The master cylinder 14 holds a primary piston 12a and a secondary piston 12b in a manner to allow advancement and retreat thereof. The master cylinder 14, which is depicted in FIG. 1, is the tandem master cylinder 14 and has two pressure chambers 13a, 13b that are partitioned by the primary piston 12a and the secondary piston 12b.

The primary piston 12a is provided at a tip of the piston rod 11. The secondary piston 12b is connected to the primary piston 12a via a coil spring 15a that is arranged in the pressure chamber 13a. A coil spring 15b that is connected to the secondary piston 12b is arranged in the pressure chamber 13b. For example, spring forces of the two coil springs 15a, 15b are equal to each other.

Capacity of each of the two pressure chambers 13a, 13b is changed in accordance with the stroke amount of the piston rod 11. The two pressure chambers 13a, 13b are connected to hydraulic circuits 28, 30, respectively. When the brake pedal 10 is operated, the primary piston 12a and the secondary piston 12b are pressed via the piston rod 11, and the hydraulic oil moves into each of the hydraulic circuits 28, 30.

The brake hydraulic pressure controller 20 includes the two hydraulic circuits 28, 30 that have the same configurations. The one hydraulic circuit 28 is supplied with the hydraulic oil from the one pressure chamber 13a of the master cylinder 14. The other hydraulic circuit 30 is supplied with the hydraulic oil from the other pressure chamber 13b of the master cylinder 14.

The brake hydraulic circuit 1 according to this embodiment is configured as of a so-called X-shaped piping type in which each of the hydraulic circuits 28, 30 controls a hydraulic pressure of a pair that has a front wheel and a rear wheel at diagonal positions in the vehicle.

Figure 1:
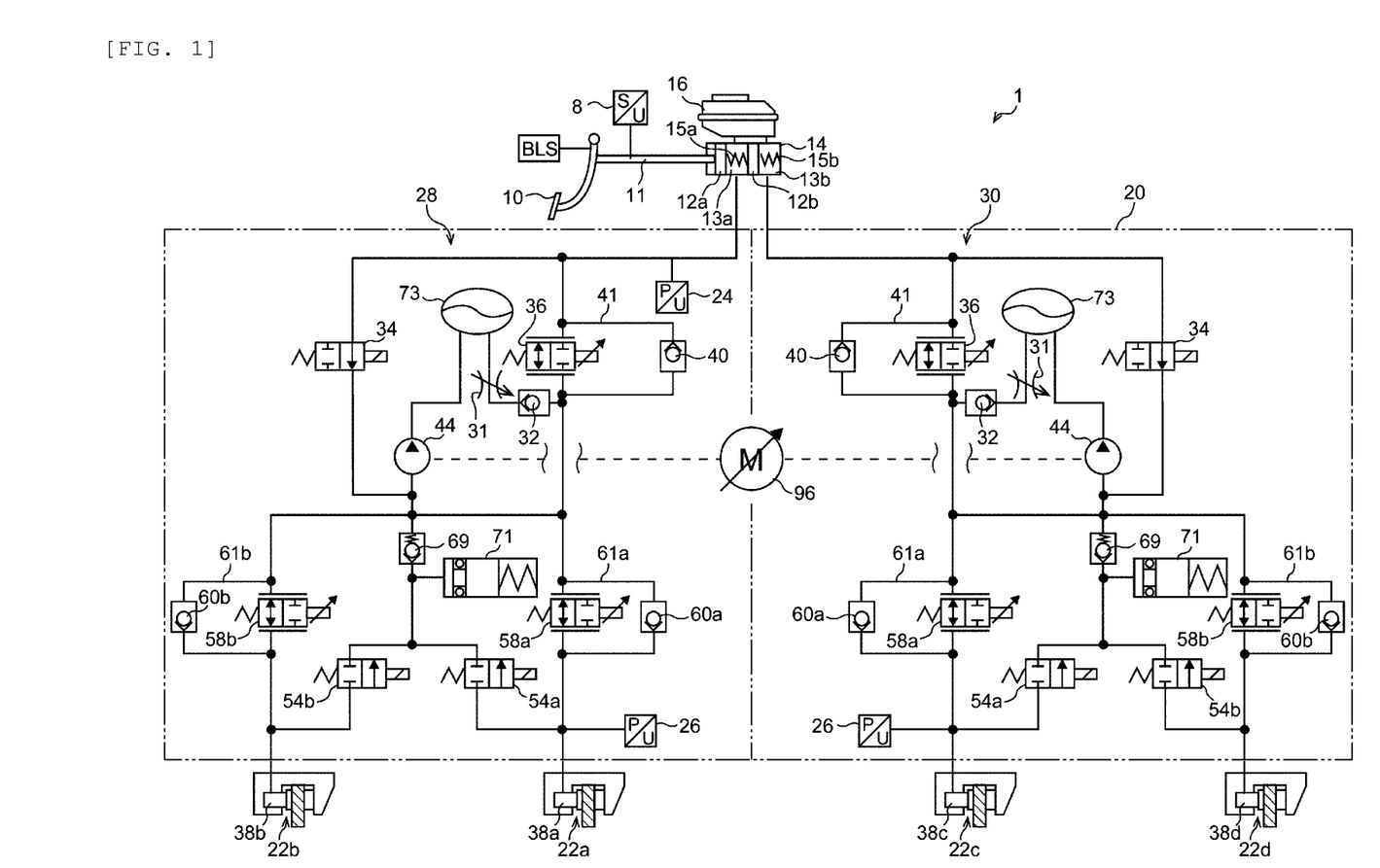
FIG. 1 is a circuit diagram of a brake hydraulic circuit according to an embodiment of the present invention.

In an example depicted in FIG. 1, a hydraulic fluid is supplied to a wheel cylinder 38a in a hydraulic brake 22a of a front right wheel (FR) and a wheel cylinder 38b in a hydraulic brake 22b of a rear left wheel (RL) via the hydraulic circuit 28.

Meanwhile, the hydraulic fluid is supplied to a wheel cylinder 38c in a hydraulic brake 22c of a front left wheel (FL) and a wheel cylinder 38d in a hydraulic brake 22d of a rear right wheel (RR) via the hydraulic circuit 30.

Note that the brake system is not limited to that of the X-shaped piping type. In addition, the brake system is not limited to the brake system for the four-wheel drive vehicle but may be a brake system for a two-wheeled motor vehicle or a vehicle other than those.

In the brake hydraulic circuit 1 according to this embodiment, the hydraulic circuit 30 has the similar configuration to the hydraulic circuit 28. A description will hereinafter be made on the hydraulic circuit 28, and a description on the hydraulic circuit 30 will not be made.

The hydraulic circuit 28 that is supplied with the hydraulic oil from the pressure chamber 13a in the master cylinder 14 includes plural electromagnetic valves. The electromagnetic valves include: a circuit control valve 36 that is of a normally closed type and can be controlled linearly; a suction control valve 34 that is of a normally closed type and is subjected to on/off control; booster regulators 58a, 58b, each of which is of a normally open type and can be controlled linearly; and pressure regulators 54a, 54b, each of which is of the normally closed type and is subjected to the on/off control.

The hydraulic circuit 28 includes a pump element 44 that is driven by a motor 96. The hydraulic circuit 28 also includes an accumulator 71 and a damper 73.

The circuit control valve 36 communicates or blocks between the master cylinder 14 and each of the booster regulators 58a, 58b. The suction control valve 34 communicates or blocks between the master cylinder 14 and a suction side of the pump element 44. Driving of each of the circuit control valve 36 and the suction control valve 34 is controlled by an electronic control unit (ECU), which is not depicted.

The circuit control valve 36 has a bypass channel 41 that includes a check valve 40. The check valve 40 allows movement of the hydraulic oil from the master cylinder 14 side to the hydraulic brake 22a side of the front right wheel and the hydraulic brake 22b side of the rear left wheel via the bypass channel 41. Meanwhile, the check valve 40 disallows the movement of the hydraulic oil from a side of the hydraulic brake 22a of the front right wheel and the hydraulic brake 22b of the rear left wheel to the master cylinder 14 side via the bypass channel 41.

For example, when the circuit control valve 36 is brought into a closed state due to failure of the circuit control valve 36, the check valve 40 guarantees the movement of the hydraulic oil from the master cylinder 14 side to the hydraulic brake 22a side of the front right wheel and the hydraulic brake 22b side of the rear left wheel.

The booster regulator 58a and the pressure regulator 54a are provided in a pipeline that communicates with the wheel cylinder 38a in the hydraulic brake 22a of the front right wheel. The booster regulator 58a and the pressure regulator 54a are used to control the hydraulic brake 22a of the front right wheel.

The booster regulator 58b and the pressure regulator 54b are provided in an oil channel that communicates with the wheel cylinder 38b in the hydraulic brake 22b of the rear left wheel. The booster regulator 58b and the pressure regulator 54b are used to control the hydraulic brake 22b of the rear left wheel. Driving of each of the booster regulators 58a, 58b and the pressure regulators 54a, 54b is controlled by the ECU, which is not depicted.

The booster regulator 58a is provided between the circuit control valve 36 and the hydraulic brake 22a of the front right wheel. The booster regulator 58a can be controlled linearly and continuously regulates a flow rate of the hydraulic oil from a side of the master cylinder 14 and the circuit control valve 36 to the wheel cylinder 38a side in the hydraulic brake 22a of the front right wheel.

The booster regulator 58a has a bypass channel 61a that includes a check valve 60a. The check valve 60a allows movement of the hydraulic oil from the hydraulic brake 22a side of the front right wheel to the side of the master cylinder 14 and the circuit control valve 36 via the bypass channel 61a. Meanwhile, the check valve 60a disallows the movement of the hydraulic oil from the side of the master cylinder 14 and the circuit control valve 36 to the hydraulic brake 22a side of the front right wheel via the bypass channel 61a.

For example, when the booster regulator 58a is brought into the closed state due to failure of the booster regulator 58a, the check valve 60a guarantees the movement of the hydraulic oil from the hydraulic brake 22a side of the front right wheel to the side of the master cylinder 14 and the circuit control valve 36 via the bypass channel 61a.

The pressure regulator 54a is the electromagnetic valve that can only be switched between a fully open state and a fully closed state. The pressure regulator 54a is provided between the wheel cylinder 38a in the hydraulic brake 22a of the front right wheel and the accumulator 71. The pressure regulator 54a in an open state supplies the hydraulic oil that has been supplied to the wheel cylinder 38a in the hydraulic brake 22a of the front right wheel to the accumulator 71 and thereby reduces the hydraulic pressure.

While changing a volume of the accumulator 71 in accordance with a pressure of the hydraulic oil that is supplied via the pressure regulators 54*a*, 54*b*, the accumulator 71 accumulates or releases the hydraulic oil.

Note that the pressure regulator 54*a* can regulate the flow rate of the hydraulic oil that flows from the wheel cylinder 38*a* in the hydraulic brake 22*a* of the front right wheel into the accumulator 71 when repeatedly opened and closed intermittently.

The booster regulator 58*a* is provided between the wheel cylinder 38*b* in the hydraulic brake 22*b* of the rear left wheel and the pipeline that connects the circuit control valve 36 and the booster regulator 58*a*. The booster regulator 58*b* can be controlled linearly and continuously regulates the flow rate of the hydraulic oil from a side of the master cylinder 14, the circuit control valve 36, the booster regulator 58*a*, and the wheel cylinder 38*a* in the hydraulic brake 22*a* of the front right wheel to the wheel cylinder 38*b* side in the hydraulic brake 22*b* of the rear left wheel.

The booster regulator 58*b* has a bypass channel 61*b* that includes a check valve 60*b*. The check valve 60*b* allows the movement of the hydraulic oil from the hydraulic brake 22*b* side of the rear left wheel to the side of the master cylinder 14 and the circuit control valve 36 via the bypass channel 61*b*. Meanwhile, the check valve 60*b* disallows the movement of the hydraulic oil from the side of the master cylinder 14 and the circuit control valve 36 to the hydraulic brake 22*b* side of the rear left wheel via the bypass channel 61*b*.

For example, when the booster regulator 58*b* is brought into the closed state due to failure of the booster regulator 58*b*, the check valve 60*b* guarantees the movement of the hydraulic oil from the hydraulic brake 22*b* side of the rear left wheel to the side of the master cylinder 14 and the circuit control valve 36 via the bypass channel 61*b*.

The pressure regulator 54*b* is the electromagnetic valve that can only be switched between the fully open state and the fully closed state. The pressure regulator 54*b* is provided between the wheel cylinder 38*b* in the hydraulic brake 22*b* of the rear left wheel and the accumulator 71. The pressure regulator 54*b* in the open state supplies the hydraulic oil that has been supplied to the wheel cylinder 38*b* in the hydraulic brake 22*b* of the rear left wheel to the accumulator 71 and thereby reduces the hydraulic pressure.

Note that the pressure regulator 54*b* can regulate the flow rate of the hydraulic oil that flows from the wheel cylinder 38*b* in the hydraulic brake 22*b* of the rear left wheel into the accumulator 71 when repeatedly opened and closed intermittently.

The pump element 44 is driven by the motor 96 and releases the hydraulic oil. Driving of the motor 96 is controlled by the ECU, which is not depicted. Note that the number of the pump element 44 is not limited to one.

A release side of the pump element 44 is connected to the pipeline that connects the circuit control valve 36 and the booster regulators 58*a*, 58*b*. The damper 73 is provided on the release side of the pump element 44. The damper 73 has a function of reducing a vibration or vibration noise with which a change in the flow rate of the hydraulic oil in the hydraulic circuit 28 is accompanied.

A variable throttle 31 and a check valve 32 are provided between the damper 73 and the pipeline that connects the circuit control valve 36 and the booster regulators 58*a*, 58*b*. The variable throttle 31 regulates the flow rate of the hydraulic oil that is supplied via the damper 73.

While the check valve 32 allows the movement of the hydraulic oil from the damper 73 side to a side of the pipeline that connects the circuit control valve 36 and the booster regulators 58*a*, 58*b*, the check valve 32 disallows the movement of the hydraulic oil in a reverse direction.

A check valve 69 is provided in the pipeline that connects the pressure regulators 54*a*, 54*b* and the suction side of the pump element 44. While the check valve 69 allows the movement of the hydraulic oil from the pressure regulators 54*a*, 54*b* side to the suction side of the pump element 44, the check valve 69 disallows the movement of the hydraulic oil in a reverse direction.

A first pressure sensor 24 is provided in a pipeline that communicates with the pressure chamber 13*a* of the master cylinder 14. The first pressure sensor 24 detects a hydraulic pressure in the pressure chamber 13*a* (a master cylinder pressure).

A second pressure sensor 26 is provided in the pipeline that communicates with the wheel cylinder 38*a* in the hydraulic brake 22*a* of the front right wheel. The second pressure sensor 26 detects a wheel cylinder pressure. Note that the second pressure sensor 26 may be provided in the pipeline that communicates with the wheel cylinder 38*b* in the hydraulic brake 22*b* of the rear left wheel.

By the way, the other hydraulic circuit 30 that is supplied with the hydraulic oil from the pressure chamber 13*b* of the master cylinder 14 controls the hydraulic brake 22*c* of the front left wheel and the hydraulic brake 22*d* of the rear right wheel. The hydraulic circuit 30 is configured in a similar manner to the hydraulic circuit 28 except for points that the wheel cylinder 38*a* in the hydraulic brake 22*a* of the front right wheel in the above description on the hydraulic circuit 28 is replaced with the wheel cylinder 38*c* in the hydraulic brake 22*c* of the front left wheel and that the wheel cylinder 38*b* in the hydraulic brake 22*b* of the rear left wheel is replaced with the wheel cylinder 38*d* in the hydraulic brake 22*d* of the rear right wheel.

2. Pump Element

Figure 2:
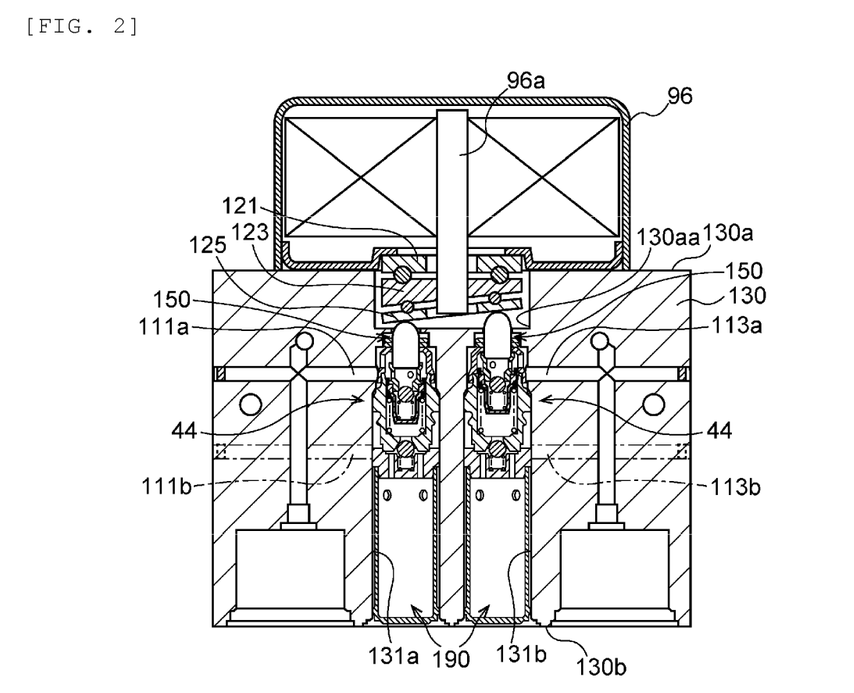
FIG. 2 is a cross-sectional view of a brake hydraulic pressure controller according to the embodiment.

FIG. 2 is a cross-sectional view of the brake hydraulic pressure controller 20 according to this embodiment. FIG. 2 depicts a cross section that includes axes of the two pump elements 44 provided in the two hydraulic circuits 28, 30.

The motor 96 is attached to one side surface 130*a* of a housing 130 of the brake hydraulic pressure controller 20. The motor 96 is arranged such that a tip side of a motor shaft 96*a* is directed inward in the housing 130.

A rotary member 123 is fixed to a tip of the motor shaft 96*a*. A surface of the rotary member 123 that faces the motor 96 side is formed to cross an axial direction of the motor shaft 96*a* at right angle, and a surface thereof that faces oppositely is formed to be inclined with respect to the axial direction of the motor shaft 96*a*.

The surface of the rotary member 123 that faces the motor 96 side is supported by a bearing member 121. A skew plate 125 is arranged in parallel with and is fixed to the surface of the rotary member 123 that faces oppositely from the motor 96 side. That is, the skew plate 125 is arranged in a manner to be inclined with respect to the axial direction of the motor shaft 96*a*.

The tip of the motor shaft 96*a*, the rotary member 123, and the skew plate 125 are arranged in a motor connection groove 130*aa* that is formed on the side surface 130*a* of the housing 130. The motor connection groove 130*aa* is a recess that is formed in a columnar shape, for example.

In a side surface 130*b* that is located on a back surface side of the side surface 130*a* of the housing 130, to which the motor 96 is attached, a pump accommodation holes 131*a*, 131*b* that respectively accommodate the two pump elements 44 are formed.

Each of the pump accommodation holes 131a, 131b is a stepped hole in a substantially columnar shape that extends in a parallel direction with the axial direction of the motor shaft 96a. One end side of each of the pump accommodation holes 131a, 131b is opened to the side surface 130b of the housing 130, and the other end side thereof is opened to a bottom surface of the motor connection groove 130aa.

Two internal channels 111a, 111b are connected to the pump accommodation hole 131a from a direction that crosses an axial direction of the pump accommodation hole 131a. Two internal channels 113a, 113b are connected to the pump accommodation hole 131b from a direction that crosses an axial direction of the pump accommodation hole 131b.

The internal channels 111a, 113a of these are each a channel through which a brake fluid is delivered to the pump element 44. Meanwhile, each of the internal channels 111b, 113b is a channel to which the brake fluid released from the pump element 44 flows out.

Each of the two pump elements 44 has a piston 150 that abuts the skew plate 125. Each of the two pump elements 44 is driven by rotation of the motor shaft 96a and the skew plate 125, which causes reciprocation of the piston 150 to suction or release the brake fluid.

Figure 3:
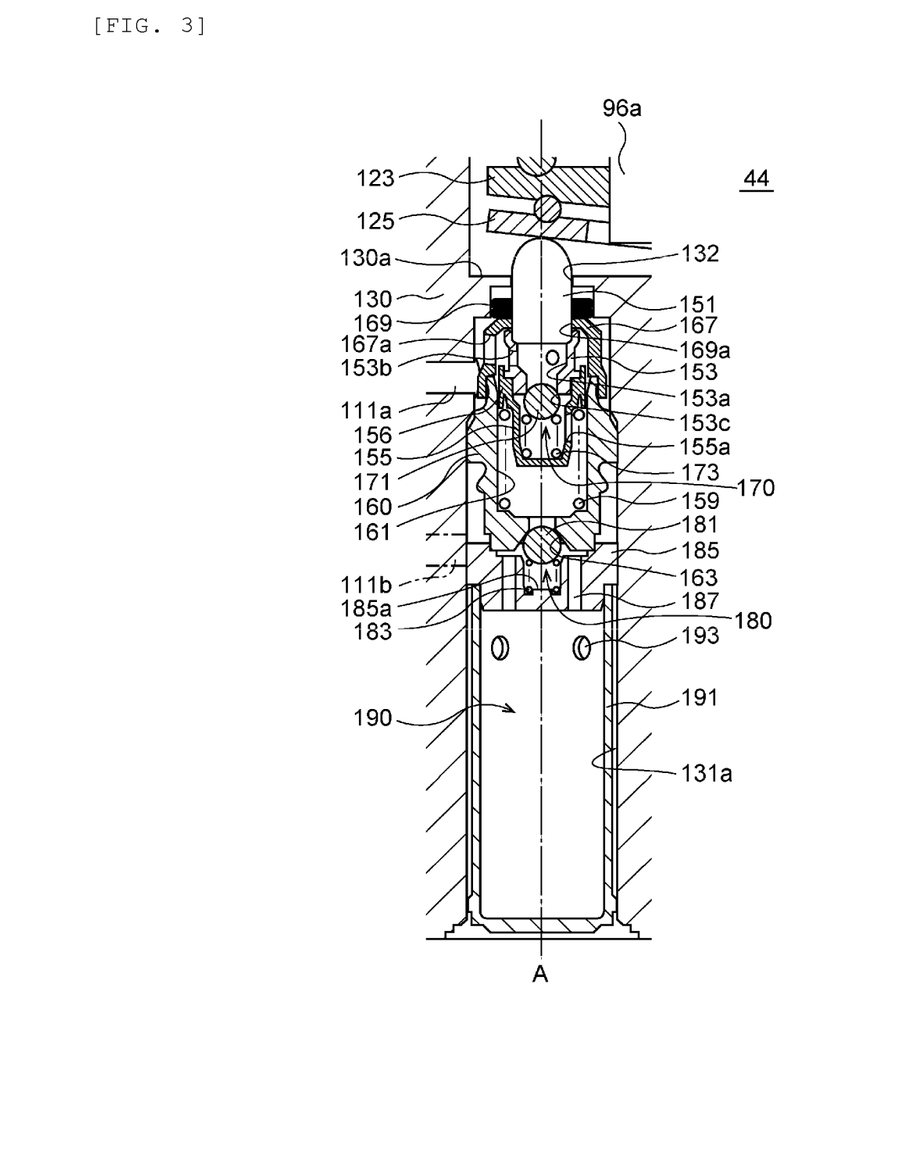
FIG. 3 is a cross-sectional view of a configuration example of a pump element according to the embodiment.

FIG. 3 is an enlarged view of the pump element 44 on a left side of the two pump elements 44, which are depicted in FIG. 2. Note that the pump element 44 on a right side is configured to be substantially symmetrical about an axis A of the pump element 44, which is depicted in FIG. 3, as a center line. In the following description, there is a case where an arrangement direction of the piston 150 in the pump element 44 will be referred to as a tip side and where an arrangement direction of a pressure damper chamber 190 will be referred to as a rear end side.

The pump element 44 has the piston 150, a spring 159, an accommodation member 160, a suction valve 170, a release valve 180, and the pressure damper chamber 190.

In conjunction with the rotation of the skew plate 125, the piston 150 reciprocates in parallel with the axial direction of the motor shaft 96a. A portion of the piston 150 on the rear end side is accommodated in the accommodation member 160. For example, the accommodation member 160 is a member that is press-fitted into and fixed to the pump accommodation hole 131a, and has an accommodation chamber 161 therein. The accommodation chamber 161 is an axial hole that is provided along a direction of the axis A.

The tip side of the accommodation chamber 161 is set as an opening end, and a rear end of the piston 150 is slidably inserted therein from the tip side. In addition, the spring 159 is accommodated in the accommodation chamber 161. The spring 159 is a mode of an urging member, is held in a compressed state between the piston 150 and a rear end surface of the accommodation member 160, and urges the piston 150 toward the tip side.

A guide member 167 is mounted on a tip of the accommodation member 160. The guide member 167 has a sliding hole 167a in which the piston 150 is held in a freely slidable manner.

One or plural through holes 167b are provided on a circumferential surface of the guide member 167. Each of the through holes 167b communicates between the outside and the inside of the guide member 167.

In this embodiment, the piston 150 is configured to include a tip member 151, an intermediate member 153, and a base section 155.

The tip member 151 is a substantially columnar member, a tip of which is formed in a projected curved surface. The tip member 151 is a portion that comes into contact with the skew plate 125, and a rear end thereof is held by the intermediate member 153. The tip member 151 can slide in the sliding hole 167a of the guide member 167 and an opening 132 provided on the bottom surface of the motor connection groove 130aa.

On the tip side of the guide member 167, an annular seal member 169 is provided between the tip member 151 and the pump accommodation hole 131a. The annular seal member 169 prevents leakage of the brake fluid from the pump accommodation hole 131a to the motor connection groove 130aa.

The intermediate member 153 is a substantially columnar hollow member having an axial hole 153a that is opened at both ends in the direction of the axis A. The tip member 151 is held at a tip of the intermediate member 153, and a rear end of the intermediate member 153 is held by the base section 155.

One or plural through holes 153b are provided on a circumferential surface of the intermediate member 153. Each of the through holes 153b communicates between the outside and the inside of the intermediate member 153.

The base section 155 is a substantially columnar hollow member, and the tip side thereof holds the intermediate member 153 and is formed as an opening end. The base section 155 has a sliding section 156 that can slide on an inner circumferential surface of the accommodation chamber 161 of the accommodation member 160.

One or plural through holes 155a are provided on a circumferential surface of the base section 155 on the rear end side from the sliding section 156. Each of the through holes 155a communicates between the outside and the inside of the base section 155. A valve body 171 and a spring 173 that constitute the suction valve 170 are accommodated in the base section 155.

The spring 173 is held in a compressed state between the valve body 171 and a rear end surface 155b of the base section 155 and urges the valve body 171 toward the intermediate member 153. A circumferential edge of the opening on the rear end side of the axial hole 153a in the intermediate member 153 serves as a seat section 153c that the valve body 171 abuts.

A tapered hole 163 is provided on the rear end surface of the accommodation member 160. The tapered hole 163 communicates between the outside on the rear end side of the accommodation member 160 and the accommodation chamber 161. The tapered hole 163 is provided such that a diameter thereof is increased toward the rear end side. The tapered hole 163 serves as a seat section that a valve body 181 of the release valve 180 abuts.

The release valve 180 is configured to include the valve body 181, a spring 183, and a support member 185. For example, the support member 185 is a member that is press-fitted into and fixed to the pump accommodation hole 131a. The support member 185 is fitted to a rear end of the accommodation member 160.

The support member 185 has a spring accommodation groove 185a and one or plural through holes 187. The spring accommodation groove 185a is a columnar space that is opened to the tip side. The spring 183 is accommodated in the spring accommodation groove 185a.

The spring 183 is held in a compressed state between the valve body 181 and a bottom surface of the spring accommodation groove 185a. The spring 183 urges the valve body 181 toward the tapered hole 163.

Each of the through holes 187 is an axial hole that is opened to both axial ends of the support member 185. An opening end of a sleeve 191 is fitted to the rear end of the support member 185. An internal space of the sleeve 191 functions as the pressure damper chamber 190. This pressure damper chamber 190 is provided on the rear end side of the pump element 44 in the direction of the axis A in which the piston 150 reciprocates.

The brake fluid that is released from the release valve 180 is delivered to the pressure damper chamber 190 through each of the through holes 187. One or plural through holes 193 are provided on a circumferential surface of the sleeve 191. Each of the through holes 193 communicates with a channel 111b that is formed in the housing 130.

4. Operation of Pump Element

Next, a description will be made on an operation of the pump element 44, which is depicted in FIG. 3.

In the case where the piston 150 moves to the tip side in conjunction with the rotation of the motor shaft 96a and the skew plate 125, a volume of the accommodation chamber 161 is increased, and the hydraulic pressure in the accommodation chamber 161 is reduced. The release valve 180 is thereby closed.

At this time, the release valve 180 is opened by the hydraulic pressure of the brake fluid that flows from the channel 111a into the axial hole 153a of the intermediate member 153 via the through hole 167b of the guide member 167 and the through hole 153b of the intermediate member 153. In this way, the brake fluid that has flowed through the suction valve 170 flows into the accommodation chamber 161 via the through hole 155a of the base section 155.

On the other hand, in the case where the piston 150 moves to the rear end side in conjunction with the rotation of the motor shaft 96a and the skew plate 125, the volume of the accommodation chamber 161 is reduced, and the hydraulic pressure in the accommodation chamber 161 is increased. The suction valve 170 is thereby closed.

The release valve 180 is opened in conjunction with the increase in the hydraulic pressure in the accommodation chamber 161. In this way, the brake fluid that has flowed through the release valve 180 flows into the pressure damper chamber 190 via the through hole 187 of the support member 185. The brake fluid that has flowed into the pressure damper chamber 190 further flows out to the channel 111b via the through hole 193.

As described above, the pump element 44 repeatedly suctions and releases the brake fluid in conjunction with the rotation of the motor shaft 96a and the skew plate 125. Because a stroke amount of the piston 150 is changed in accordance with an inclination angle of the skew plate 125, a release amount of the brake fluid from the pump element 44 can be set in accordance with the inclination angle of the skew plate 125.

Because the brake fluid that is released from the pump element 44 flows out to the channel 111b via the pressure damper chamber 190, pressure pulsations of the brake fluid that flows through the channel 111b are reduced.

5. Configuration Example of Housing

Figure 4:
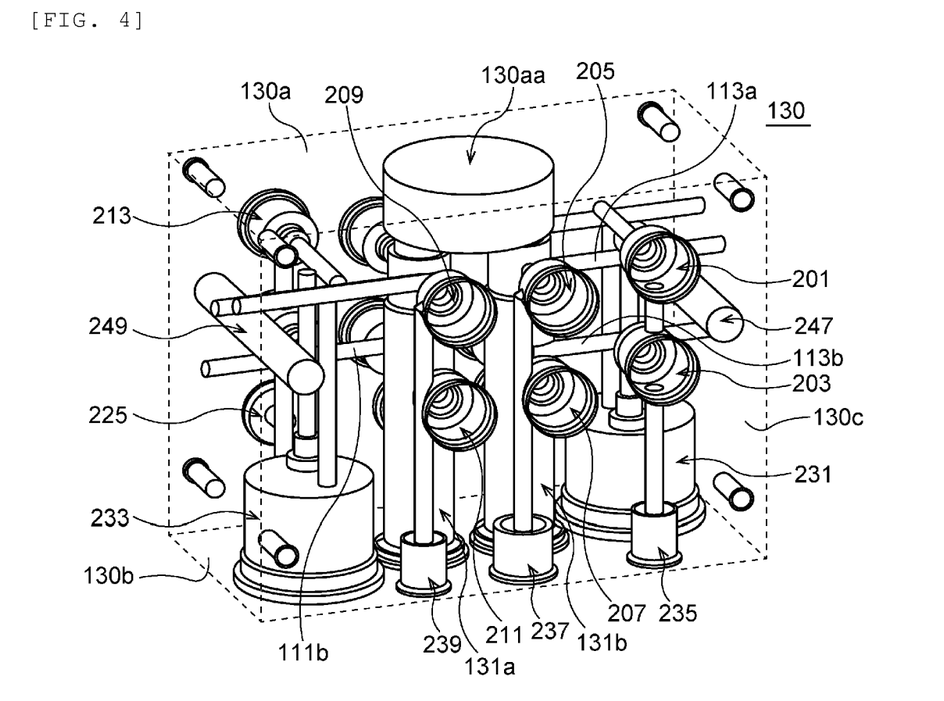
FIG. 4 is a perspective view of a configuration example of a housing according to the embodiment.
Figure 5:
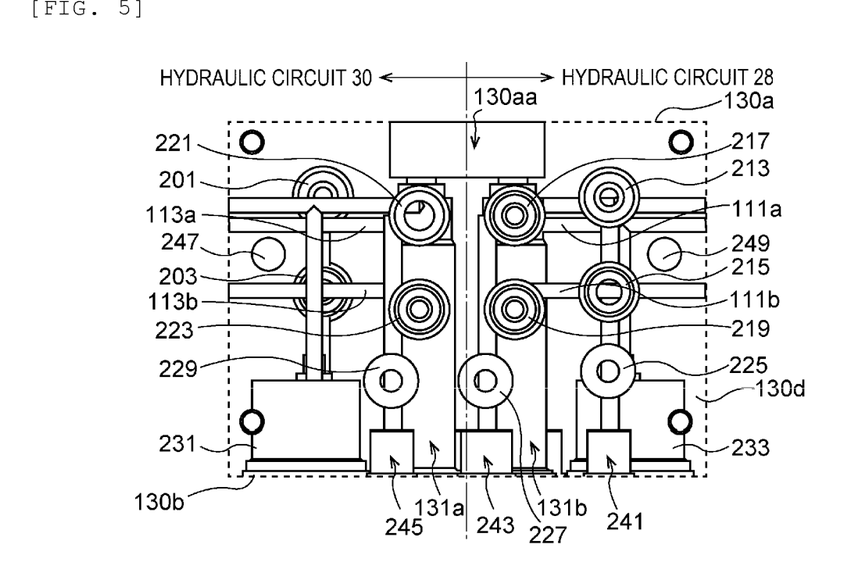
FIG. 5 is a side view of the configuration example of the housing according to the embodiment.

FIG. 4 and FIG. 5 are explanatory views of a configuration example of the housing 130 of the brake hydraulic pressure controller 20 according to this embodiment. FIG. 4 is a perspective view in which an internal configuration of the housing 130 is indicated by solid lines, and FIG. 5 is a side view of the housing 130 in FIG. 4 that is seen from a back surface side.

The housing 130 is made of metal and has plural connection sections in which the motor, the pump element, regulation valves (the booster regulators, the pressure regulators, the suction control valves, and the circuit control valves), the accumulators, the pressure sensors, and the like are provided.

More specifically, the housing 130 has the motor connection groove 130aa. The housing 130 also has: connection sections 211, 215 to which the booster regulators 58a, 58b provided in the hydraulic circuit 28 are respectively attached; connection sections 209, 213 to which the pressure regulators 54a, 54b are respectively attached; a connection section 217 to which the suction control valve 34 is attached; and a connection section 219 to which the circuit control valve 36 is attached.

The housing 130 has: connection sections 203, 223 to which the booster regulators 58a, 58b provided in the hydraulic circuit 30 are respectively attached; connection sections 201, 221 to which the pressure regulators 54a, 54b are respectively attached; a connection section 205 to which the suction control valve 34 is attached; and a connection section 207 to which the circuit control valve 36 is attached.

The housing 130 has accumulator bores 231, 233 that are respectively provided in the hydraulic circuits 28, 30. The housing 130 has: connection sections 237, 243 to which fluid pipes connected to the master cylinders 14 are connected; and connection sections 235, 239, 241, 245 to which fluid pipes connected to the wheel cylinders 38a to 38d of the wheels are connected.

The housing 130 has: connection sections 225, 227, 229 to which the pressure sensors 24, 26 are attached; and the pump accommodation holes 131a, 131b to which the pump elements 44 are attached. The housing 130 has connection sections 247, 249 used to fix the ECU.

The housing 130 further has the internal channels (including 111a, 111b, 113a, 113b), each of which communicates with corresponding one of the connection sections.

As described above, in the brake hydraulic pressure controller 20 according to this embodiment, the pump element 44 constitutes a skew plate pump that is driven by the skew plate 125 rotated by the motor 96.

Accordingly, the pump accommodation holes 131a, 131b are provided on the side surface 130b as the surface opposing the side surface 130a that is formed with the motor connection groove 130aa. In addition, on side surfaces 130c, 130d that are perpendicular to both of these side surfaces 130a, 130b, the connection sections 201 to 223, to which the regulation valves are attached, are formed.

By changing a distance between the two side surfaces 130a, 130b that are parallel to each other, the pump elements 44 can be accommodated in the housing 130 in accordance with size of the pressure damper chamber 190 that is provided on the rear end side of each of the two pump elements 44 in the axial direction. Thus, such a size change that the pressure damper chamber 190 provided in each of the plural pump elements 44 is increased in size can easily be made.

All of the connection sections 235 to 245, to which the various fluid pipes are connected, are provided on the same side surface 130b. Thus, mountability on the vehicle is also guaranteed.

6. Modified Examples

In the brake hydraulic pressure controller 20 according to this embodiment, the skew plate pumps are used, and the pump elements 44, each of which has the axis along the parallel direction with the axis of the motor shaft 96a of the motor 96, are provided.

Each of the pump elements 44 is provided such that the piston 150 at a tip thereof abuts the skew plate 125 that rotates with the motor shaft 96a. Thus, the number of the pump elements 44 can be increased relatively easily.

Figure 6:
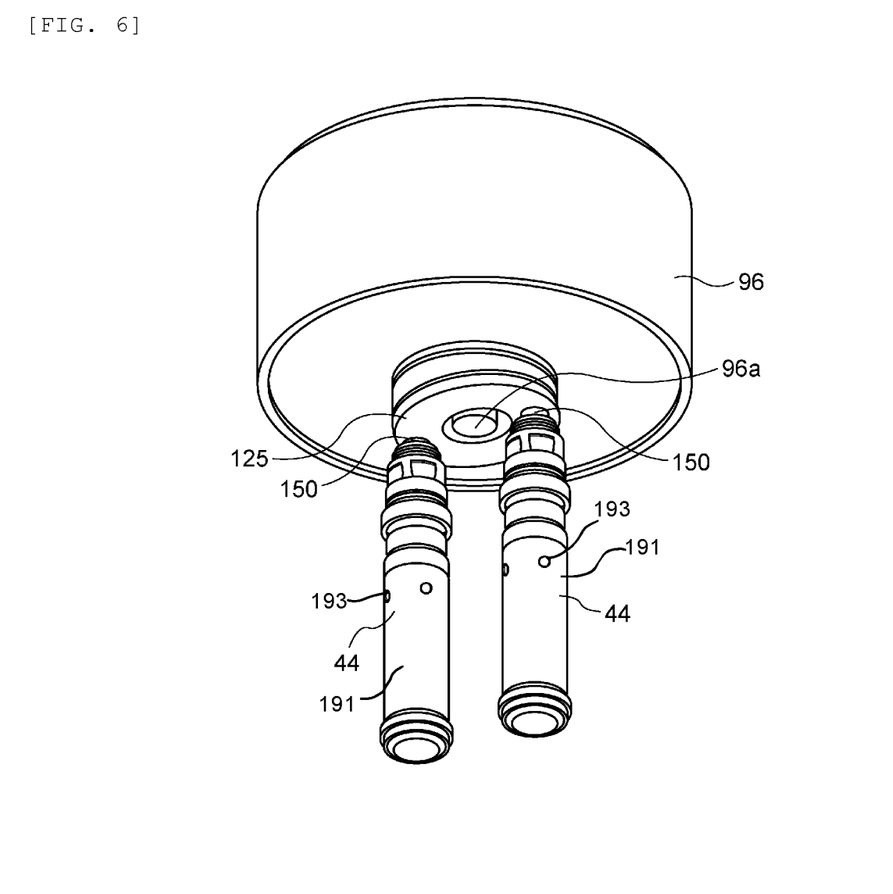
FIG. 6 is a perspective view of arrangement of the two pump elements.

FIG. 6 is a perspective view that only depicts the motor 96 and the pump elements 44 in the brake hydraulic pressure controller 20 according to the above embodiment. In the above embodiment, the two pump elements 44 are provided. The pistons 150 at the tips of the two pump elements 44 abut the skew plate 125 at equal intervals of 180 degrees.

Figure 7:
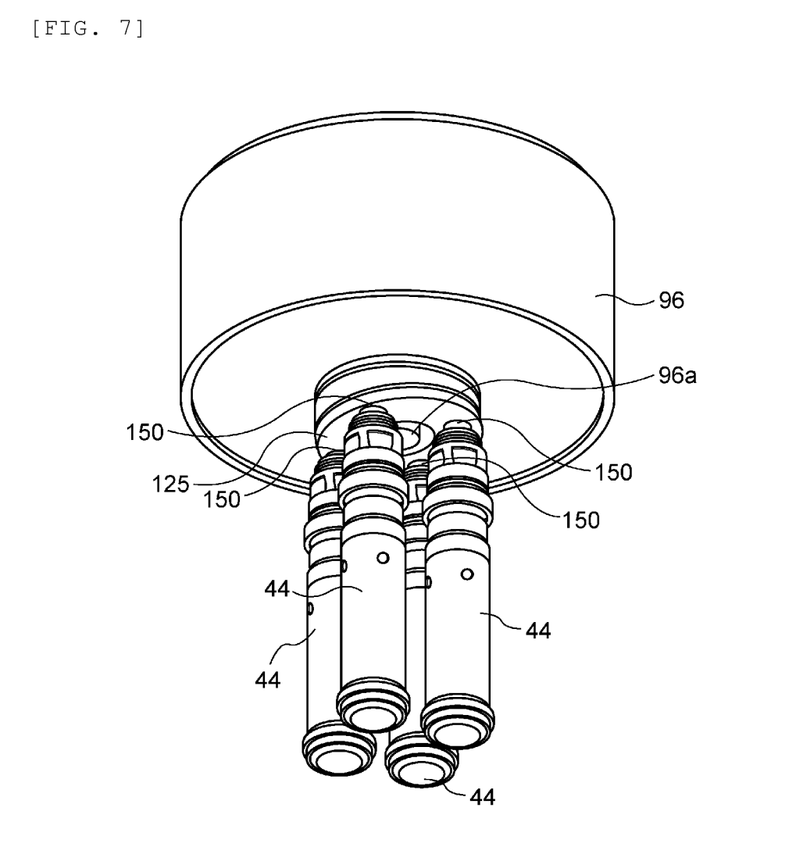
FIG. 7 is a perspective view of arrangement of the four pump elements.

Meanwhile, FIG. 7 depicts an example in which the four pump elements 44 are provided. In the case where the four pump elements 44 are provided, the pistons 150 at the tips of the pump elements 44 abut the skew plate 125 at equal intervals of 90 degrees.

All of the four pump elements 44 are arranged such that the axial directions thereof are parallel with the axial direction of the motor shaft 96a. Accordingly, a volume of a space that is occupied by the motor 96 and the pump elements 44 is not significantly increased. Thus, enlargement of the brake hydraulic pressure controller 20 can be suppressed depending on a layout of the internal channels and the connection sections.

In addition, the four pump elements 44 are arranged around the axis of the motor shaft 96a such that the axial directions thereof are parallel with the axis of the motor shaft 96a. Thus, even in the case where the size of the pressure damper chamber 190, which is provided on the rear end side of each of the pump elements 44, is increased, enlargement of the housing 130 can be suppressed.

As it has been described so far, in the brake hydraulic pressure controller 20 according to this embodiment, the plural pump elements 44 are arranged around the axis of the motor shaft 96a such that the axial directions thereof are parallel with the axis of the motor shaft 96a. The pressure damper chamber 190 is provided on the rear end side of each of the pump elements 44 along the reciprocal direction of the piston 150. The side surface 130a of the housing 130, to which the motor 96 is attached, and the side surface 130b, to which the pump elements 44 are attached, are parallel surfaces with each other.

Accordingly, by changing the distance between these side surfaces 130a, 130b, the pressure damper chamber 190 of each of the plural pump elements 44 can be enlarged without significantly enlarging the housing 130.

In addition, in the brake hydraulic pressure controller 20 according to this embodiment, the plural pump elements 44 are arranged around the axis of the motor shaft 96a. Thus, even in the case where the number of the pump elements 44 is increased, the enlargement of the housing 130 can be suppressed.

The detailed description has been made so far on the preferred embodiment of the present invention with reference to the accompanying drawings. However, the present invention is not limited to such an embodiment. It is obvious that a person who has basic knowledge in the technical field to which the present invention pertains could have easily arrived at various modification examples and correction examples that fall within the scope of the technical idea described in the claims. It is understood that those naturally fall within the technical scope of the present invention.

In the above embodiment, the description has been made on the brake hydraulic pressure controller mounted on the four-wheel drive vehicle as the example. However, the present invention is not limited to such an example. The brake hydraulic pressure controller may be mounted on the two-wheeled motor vehicle such as a motorcycle or another vehicle.

REFERENCE SIGNS LIST

20: Brake hydraulic pressure controller
28, 30: Hydraulic circuit
44: Pump element
96: Motor
96a: Motor shaft
111a, 111b, 113a, 113b: Internal channel (channel)
125: Skew plate
130: Housing
130a, 130b: Side surface
131a, 131b: Pump accommodation hole
150: Piston
159: Urging member (spring)
160: Accommodation member
161: Accommodation chamber
170: Suction valve
180: Release valve
190: Pressure damper chamber
191: Sleeve

The invention claimed is:

1. A brake hydraulic pressure controller (20) configured to control a hydraulic pressure in a brake hydraulic pressure circuit, the brake hydraulic pressure controller (20) comprising:
   a housing (130) having therein a channel (111b, 113b),
   a motor (96) that has a motor shaft (96a);
   a skew plate (125) that is fixed to a tip of the motor shaft (96a) and is arranged in a manner to be inclined with respect to an axial direction of the motor shaft (96a); and
   a pump element (44) that is driven by rotation of the motor shaft (96a) and the skew plate (125), the pump element (44) being arranged in the housing (130), wherein
   the pump element (44) has:
      a piston (150) that reciprocates in parallel with the axial direction of the motor shaft (96a) in conjunction with the rotation of the skew plate (125);
      an accommodation chamber (161) that accommodates a part of the piston (150) and into which a brake fluid is introduced;
      a suction valve (170) that introduces the brake fluid into the accommodation chamber (161);
      a release valve (180) that releases the brake fluid from the accommodation chamber (161); and
      a sleeve (191) defining a pressure damper chamber (190) that is provided in a reciprocal direction of the piston (150) and into which the brake fluid released from the release valve (180) flows, the sleeve (191) being positioned in the housing (130),
   wherein the sleeve (191) has an open end fitted to the release valve (180), a closed end opposite the open end, and a wall which extends from the open end of the sleeve (191) to the closed end of the sleeve (191) and which surrounds the pressure damper chamber (190), the wall having therein a through hole (193) through which the brake fluid is released from the pressure damper chamber (190) to the channel (111b, 113b),
   wherein an accommodation member (161) defines the accommodation chamber (160) and includes a tapered hole (163) which communicates with the accommodation chamber (161) and which is formed as a seat section, wherein the release valve (180) includes a valve body (181), a support member (185) having a through hole (187), and a spring (183) which is held in a compressed state between the support member (185) and the valve body (181) and which urges the valve body (181) toward the seat section, wherein the open end of the sleeve (191) is fitted on the support member (185) such that the pressure damper chamber (190) communicates with the through hole (187) of the support member (185), wherein, when the valve body (181) is moved away from the seat section, the brake fluid is released from the accommodation chamber (161) through the through hole (163) of the accommodation member (161) and is delivered to the pressure damper chamber (190) through the through hole (187) of the support member (185), and wherein the open end of the sleeve (191) engages a shoulder on the support member (185) and the wall of the sleeve (191) has a cylindrical inner surface extending from the open end of the sleeve (191), the cylindrical inner surface surrounding and engaging an outer surface of the support member (185) extending from the shoulder toward the closed end of the sleeve (191).

2. The brake hydraulic pressure controller according to claim 1, wherein
the pump element (44) also has:
an urging member (159) that is accommodated in the accommodation chamber (161) and urges the piston (150) toward the skew plate (125).

3. The brake hydraulic pressure controller according to claim 1, wherein
the motor (96) is attached to one side surface (130a) of the housing (130) such that the motor shaft (96a) is directed inward in the housing (130), and
the pump element (44) is accommodated in an accommodation hole (131a, 131b) that is formed on the other side surface (130b) located on a back surface side of the one side surface (130a) of the housing (130) such that the pressure damper chamber (190) is arranged on the other side surface (130b) side.

4. The brake hydraulic pressure controller according to claim 3, wherein
the brake hydraulic pressure controller (20) includes plural pump elements (44), and
the plural pump elements (44) are arranged around an axis of the motor shaft (96a).

5. The brake hydraulic pressure controller according to claim 1, wherein
the brake hydraulic pressure controller (20) includes plural pump elements (44), and
the plural pump elements (44) are arranged around an axis of the motor shaft (96a).

6. The brake hydraulic pressure controller according to claim 1, wherein the skew plate (125) is in the housing (130).

7. The brake hydraulic pressure controller according to claim 1, wherein the pump element (44) communicates, via the channel (111b, 113b), with a circuit control valve (36), booster regulators (58a, 58b), and a damper (73) separate from the pump element (44).

8. The brake hydraulic pressure controller according to claim 1, wherein the support member (185) has an additional through hole (187) through which the brake fluid is delivered to the pressure damper chamber (190).

9. The brake hydraulic pressure controller according to claim 8, wherein the wall of the sleeve (191) has therein an additional through hole (193) through which the brake fluid is released from the pressure damper chamber (190) to the channel (111b, 113b).

10. The brake hydraulic pressure controller according to claim 9, wherein the sleeve (191) is cylindrical and the wall of the sleeve (191) has a cylindrical outer surface extending from the open end of the sleeve (191).

11. The brake hydraulic pressure controller according to claim 1, wherein the sleeve (191) is cylindrical and the wall of the sleeve (191) has a cylindrical outer surface extending from the open end of the sleeve (191).

12. The brake hydraulic pressure controller according to claim 1, wherein the valve body (181) is positioned outside the sleeve (191).

13. The brake hydraulic pressure controller according to claim 1, wherein the support member (185) is fitted to an end of the accommodation member (160).

14. The brake hydraulic pressure controller according to claim 1, wherein the wall of the sleeve (191) has a cylindrical outer surface extending from the open end of the sleeve (191).

15. The brake hydraulic pressure controller according to claim 14, wherein
the motor (96) is attached to one side surface (130a) of the housing (130) such that the motor shaft (96a) is directed inward in the housing (130), and
the pump element (44) is accommodated in an accommodation hole (131a, 131b) that is formed on the other side surface (130b) located on a back surface side of the one side surface (130a) of the housing (130) such that the pressure damper chamber (190) is arranged on the other side surface (130b) side,
wherein the cylindrical outer surface of the sleeve (191) is spaced from a cylindrical inner surface of the housing (130), the inner cylindrical surface defining the accommodation hole (131a, 131b).

16. The brake hydraulic pressure controller according to claim 15, wherein a distance between the through hole (193) and the support member (185) is substantially less than a distance between the through hole (193) and the closed end of the sleeve (191).

17. A brake hydraulic pressure controller (20) configured to control a hydraulic pressure in a brake hydraulic pressure circuit, the brake hydraulic pressure controller (20) comprising:
a housing (130) having therein a channel (111b, 113b),
a motor (96) that has a motor shaft (96a);
a skew plate (125) that is fixed to a tip of the motor shaft (96a) and is arranged in a manner to be inclined with respect to an axial direction of the motor shaft (96a); and
a pump element (44) that is driven by rotation of the motor shaft (96a) and the skew plate (125), the pump element (44) being arranged in the housing (130), wherein
the pump element (44) has:
a piston (150) that reciprocates in parallel with the axial direction of the motor shaft (96a) in conjunction with the rotation of the skew plate (125);
an accommodation chamber (161) that accommodates a part of the piston (150) and into which a brake fluid is introduced;
a suction valve (170) that introduces the brake fluid into the accommodation chamber (161);
a release valve (180) that releases the brake fluid from the accommodation chamber (161); and a sleeve (191) defining a pressure damper chamber (190) that is provided in a reciprocal direction of the piston (150) and into which the brake fluid released from the release valve (180) flows, the sleeve (191) being positioned in the housing (130), wherein the sleeve (191) has an open end fitted to the release valve (180), a closed end opposite the open end, and a wall which extends from the open end of the sleeve (191) to the closed end of the sleeve (191) and which surrounds the pressure damper chamber (190), the wall having therein a through hole (193) through which the brake fluid is released from the pressure damper chamber (190) to the channel (111*b*, 113*b*), wherein an accommodation member (161) defines the accommodation chamber (160) and includes a tapered hole (163) which communicates with the accommodation chamber (161) and which is formed as a seat section, wherein the release valve (180) includes a valve body (181), a support member (185) having a through hole (187), and a spring (183) which is held in a compressed state between the support member (185) and the valve body (181) and which urges the valve body (181) toward the seat section, wherein the open end of the sleeve (191) is fitted on the support member (185) such that the pressure damper chamber (190) communicates with the through hole (187) of the support member (185), wherein, when the valve body (181) is moved away from the seat section, the brake fluid is released from the accommodation chamber (161) through the through hole (163) of the accommodation member (161) and is delivered to the pressure damper chamber (190) through the through hole (187) of the support member (185), wherein the pump element (44) is accommodated in an accommodation hole (131*a*, 131*b*) that is formed in the housing (130), a cylindrical inner surface of the housing (130) defining the accommodation hole (131*a*, 131*b*), wherein the open end of the sleeve (191) engages a shoulder on the support member (185) and the wall of the sleeve (191) has a cylindrical outer surface extending from the open end of the sleeve (191), and wherein the cylindrical outer surface of the sleeve (191) is spaced from the cylindrical inner surface of the housing (130).

18. The brake hydraulic pressure controller according to claim 17, wherein the motor (96) is attached to one side surface (130*a*) of the housing (130) such that the motor shaft (96*a*) is directed inward in the housing (130), and the accommodation hole (131*a*, 131*b*) is formed on the other side surface (130*b*) located on a back surface side of the one side surface (130*a*) of the housing (130) such that the pressure damper chamber (190) is arranged on the other side surface (130*b*) side.

19. The brake hydraulic pressure controller according to claim 18, wherein a distance between the through hole (193) and the support member (185) is substantially less than a distance between the through hole (193) and the closed end of the sleeve (191).

20. A brake hydraulic pressure controller (20) configured to control a hydraulic pressure in a brake hydraulic pressure circuit, the brake hydraulic pressure controller (20) comprising:

a housing (130) having therein a channel (111*b*, 113*b*),
a motor (96) that has a motor shaft (96*a*);

a skew plate (125) that is fixed to a tip of the motor shaft (96*a*) and is arranged in a manner to be inclined with respect to an axial direction of the motor shaft (96*a*); and a pump element (44) that is driven by rotation of the motor shaft (96*a*) and the skew plate (125), the pump element (44) being arranged in the housing (130), wherein the pump element (44) has:

a piston (150) that reciprocates in parallel with the axial direction of the motor shaft (96*a*) in conjunction with the rotation of the skew plate (125);

an accommodation chamber (161) that accommodates a part of the piston (150) and into which a brake fluid is introduced;

a suction valve (170) that introduces the brake fluid into the accommodation chamber (161);

a release valve (180) that releases the brake fluid from the accommodation chamber (161); and a sleeve (191) defining a pressure damper chamber (190) that is provided in a reciprocal direction of the piston (150) and into which the brake fluid released from the release valve (180) flows, the sleeve (191) being positioned in the housing (130), wherein the sleeve (191) has an open end fitted to the release valve (180), a closed end opposite the open end, and a wall which extends from the open end of the sleeve (191) to the closed end of the sleeve (191) and which surrounds the pressure damper chamber (190), the wall having therein a through hole (193) through which the brake fluid is released from the pressure damper chamber (190) to the channel (111*b*, 113*b*), wherein an accommodation member (161) defines the accommodation chamber (160) and includes a tapered hole (163) which communicates with the accommodation chamber (161) and which is formed as a seat section, wherein the release valve (180) includes a valve body (181), a support member (185) having a through hole (187), and a spring (183) which is held in a compressed state between the support member (185) and the valve body (181) and which urges the valve body (181) toward the seat section, wherein the open end of the sleeve (191) is fitted on the support member (185) such that the pressure damper chamber (190) communicates with the through hole (187) of the support member (185), wherein, when the valve body (181) is moved away from the seat section, the brake fluid is released from the accommodation chamber (161) through the through hole (163) of the accommodation member (161) and is delivered to the pressure damper chamber (190) through the through hole (187) of the support member (185), wherein the open end of the sleeve (191) engages a shoulder on the support member (185) and the wall of the sleeve (191) has a cylindrical inner surface extending from the open end of the sleeve (191), the cylindrical inner surface surrounding and engaging an outer surface of the support member (185) extending from the shoulder toward the closed end of the sleeve (191), and the wall of the sleeve (191) has a cylindrical outer surface extending from the open end of the sleeve (191), and wherein the pump element (44) is accommodated in an accommodation hole (131*a*, 131*b*) in the housing (130) and the cylindrical outer surface of the sleeve (191) is spaced from a cylindrical inner surface of the housing (130), the inner cylindrical surface defining the accommodation hole (131*a*, 131*b*).

21. The brake hydraulic pressure controller according to claim 20, wherein a distance between the through hole (193) and the support member (185) is substantially less than a distance between the through hole (193) and the closed end of the sleeve (191).

* * * * *